US011820363B2

(12) United States Patent
Oyama

(10) Patent No.: US 11,820,363 B2
(45) Date of Patent: Nov. 21, 2023

(54) VEHICLE CONTROL APPARATUS

(71) Applicant: TOYOTA JIDOSHA KABUSHIKI KAISHA, Toyota (JP)

(72) Inventor: Keisuke Oyama, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/353,892

(22) Filed: Jun. 22, 2021

(65) Prior Publication Data
US 2022/0017074 A1    Jan. 20, 2022

(30) Foreign Application Priority Data

Jul. 15, 2020    (JP) .................................. 2020-121524

(51) Int. Cl.
*B60W 30/06* (2006.01)
*B60W 10/04* (2006.01)
*B60W 10/18* (2012.01)
*B60W 10/20* (2006.01)
*B60N 2/02* (2006.01)

(52) U.S. Cl.
CPC ........... *B60W 30/06* (2013.01); *B60N 2/0244* (2013.01); *B60W 10/04* (2013.01); *B60W 10/18* (2013.01); *B60W 10/20* (2013.01)

(58) Field of Classification Search
CPC ...... B60W 30/06; B60W 10/04; B60W 10/18; B60W 10/20; B60N 2/0244; B60N 2/06; B60N 2002/0256; B62D 15/0285; B62D 15/027; B62D 15/028; B62D 15/029; B62D 1/00; G08G 1/00; G08G 1/168

USPC .............................................. 701/2
See application file for complete search history.

(56) References Cited

U.S. PATENT DOCUMENTS

| 2003/0087727 A1* | 5/2003 | Loibl ..................... B60T 13/662 |
| | | 477/183 |
| 2013/0320729 A1* | 12/2013 | Cooley ..................... B60N 2/06 |
| | | 297/331 |
| 2014/0207358 A1* | 7/2014 | Seguchi ................ B60W 30/17 |
| | | 701/96 |
| 2016/0185389 A1* | 6/2016 | Ishijima ............. B62D 15/0285 |
| | | 701/41 |
| 2017/0282753 A1* | 10/2017 | Zouzal ..................... B60N 2/01 |
| 2018/0056816 A1* | 3/2018 | Kim ..................... B60N 2/0228 |
| 2020/0218249 A1* | 7/2020 | Sannodo ............. B62D 15/0285 |

FOREIGN PATENT DOCUMENTS

| JP | 2011-006026 A |   | 1/2011 |
| JP | 2011006026 A | * | 1/2011 |

* cited by examiner

*Primary Examiner* — Yonel Beaulieu
*Assistant Examiner* — Jean W Charleston
(74) *Attorney, Agent, or Firm* — Sughrue Mion, PLLC

(57) ABSTRACT

A vehicle control apparatus changes its activation state to an activated state and execute an automatic pulling-out control of automatically pulling a vehicle out of a parking space to a designated place and automatically stopping the vehicle at a designated place when receiving an automatic pulling-out request command of requesting executing the automatic pulling-out control from an outside by wireless. The vehicle control apparatus holds a driver's seat at a designated backed position without displacing the driver's seat forward when changing its activation state to the activated state in response to receiving the automatic pulling-out request command.

6 Claims, 13 Drawing Sheets

VEHICLE CONTROL APPARATUS

BACKGROUND

Field

The invention relates to a vehicle control apparatus.

Description of the Related Art

There is known a vehicle control apparatus which automatically adjusts a position of a driver's seat of a vehicle to a position suitable for a driver of the vehicle to drive the vehicle when the driver turns on an ignition switch of the vehicle to start an operation of an internal combustion engine (for example, see JP 2011-6026 A).

Thereby, when the driver sits on the driver's seat and turns on the ignition switch to start the operation of the internal combustion engine, the driver's seat is automatically adjusted to the position suitable to drive the vehicle. Thus, the driver does not need to adjust the position of the driver's seat to the suitable position.

Recently, there is developed a technique of automatically pulling the vehicle into a parking space and automatically pulling the vehicle out of the parking space with the driver being outside of the vehicle. If such a technique is installed to the vehicle with the vehicle control apparatus which automatically adjusts the position of the driver's seat, the driver's seat is displaced to the position suitable to drive the vehicle when the internal combustion engine starts to be operated to automatically pull the vehicle out of the parking space by the technique. In this case, when the driver gets in the vehicle after the vehicle has been pulled out of the parking space, the driver's seat has been displaced to an advanced position. Thus, it is hard for the driver to get in the vehicle.

The invention has been made for solving the problems described above. An object of the invention is to provide a vehicle control apparatus which can automatically adjust the position of the driver's seat with ensuring that the driver easily gets in the vehicle when the vehicle has been automatically pulled out of the parking space.

SUMMARY

According to the invention, a vehicle control apparatus is installed to a vehicle and comprises an electronic control unit which executes an activation control of controlling activations of a driving apparatus, a braking apparatus, and a steering apparatus of the vehicle.

The electronic control unit is configured to change its activation state to an activated state that the electronic control unit executes the activation control when the electronic control unit receives an activation command. On the other hand, the electronic control unit is configured to change its activation state to a deactivated state that the electronic control unit does not execute the activation control when h electronic control unit receives a deactivation command.

In addition, the electronic control unit is configured to displace a driver's seat for a driver of the vehicle forward to a designated advanced position when the electronic control unit changes its activation state to the activated state. On the other hand, the electronic control unit is configured to displace the driver's seat rearward to a designated backed position located at the rear of the designated advanced position when the electronic control unit changes its activation state to the deactivation state.

In addition, the electronic control unit is configured to change its activation state to the activated state and execute an automatic pulling-out control of automatically pulling the vehicle out of a parking space to a designated place and automatically stopping the vehicle at the designated place when the electronic control unit receives an automatic pulling-out request command of requesting the electronic control unit to execute the automatic pulling-out control from an outside by wireless. Further, the electronic control unit is configured to hold the driver's seat at the designated backed position without displacing the driver's seat forward when the electronic control unit changes its activation state to the activated state in response to receiving the automatic pulling-out request command.

Thereby, the driver's seat is at the backed position when the vehicle has been stopped at the designated place by the automatic pulling-out control. Thus, the driver can easily get in the vehicle.

According to an aspect of the invention, the electronic control unit may be configured to displace the driver's seat to the designated advanced position when the driver of the vehicle sits on the driver's seat after the electronic control unit receives the automatic pulling-out request command and holds the driver's seat at the designated backed position without displacing the driver's seat forward.

Thereby, after the driver sits on the driver's seat, the driver's seat is displaced forward. Thus, the driver does not need to manually displace the driver's seat forward.

According to another aspect of the invention, the electronic control unit may be is configured to displace the driver's seat to the designated advanced position when a predetermined time elapses since the driver of the vehicle sits on the driver's seat after the electronic control unit receives the automatic pulling-out request command and holds the driver's seat at the designated backed position without displacing the driver's seat forward.

Thereby, after the driver sets on the driver's seat, the driver's seat is displaced forward. Thus, the driver does not need to manually displace the driver's seat forward. In addition, the driver's seat is automatically displaced forward after a moment when the driver sets on the driver's seat. Thus, it can be prevented from surprising the driver.

According to further another aspect of the invention, the electronic control unit may be configured to hold its activation state in the activated state when the electronic control unit terminates executing the automatic pulling-out control. Thereby, the driver does not need to perform any operation to change the activation state of the electronic control unit to the activated state after the driver gets in the vehicle.

According to further another aspect of the invention, the vehicle control apparatus may comprise an activation device which is operated by the driver to send the activation command to the electronic control unit. In this case, the electronic control unit may be configured to change its activation state from the disactivated state to the activated state and displace the driver's seat forward to the designated advanced position when the electronic control unit receives the activation command sent in response to an operation of the driver to the activation device. Further, in this case, the electronic control unit may be configured to displace the driver's seat rearward from the designated advanced position to the designated backed position when the electronic control unit is in the activated state and receives the automatic pulling-out request command.

Thereby, the driver's seat is at the backed position when the vehicle has been stopped at the designated place by the automatic pulling-out control. Thus, the driver can easily get in the vehicle.

According to further another aspect of the invention, the electronic control unit may be configured to change its activation state to the activated state, hold the driver's seat at the designated backed position without displacing the driver's seat forward, and execute an automatic pulling-in control of automatically pulling the vehicle into a designated parking space and automatically stopping the vehicle in the designated parking space when the electronic control unit is in the deactivated state and receives an automatic pulling-in request command of requesting the electronic control unit to execute the automatic pulling-in control.

Thereby, when executing the automatic pulling-in control is terminated, the driver's seat has been at the backed position. Thus, the driver does not need to manually displace the driver's seat rearward.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Figure 1:
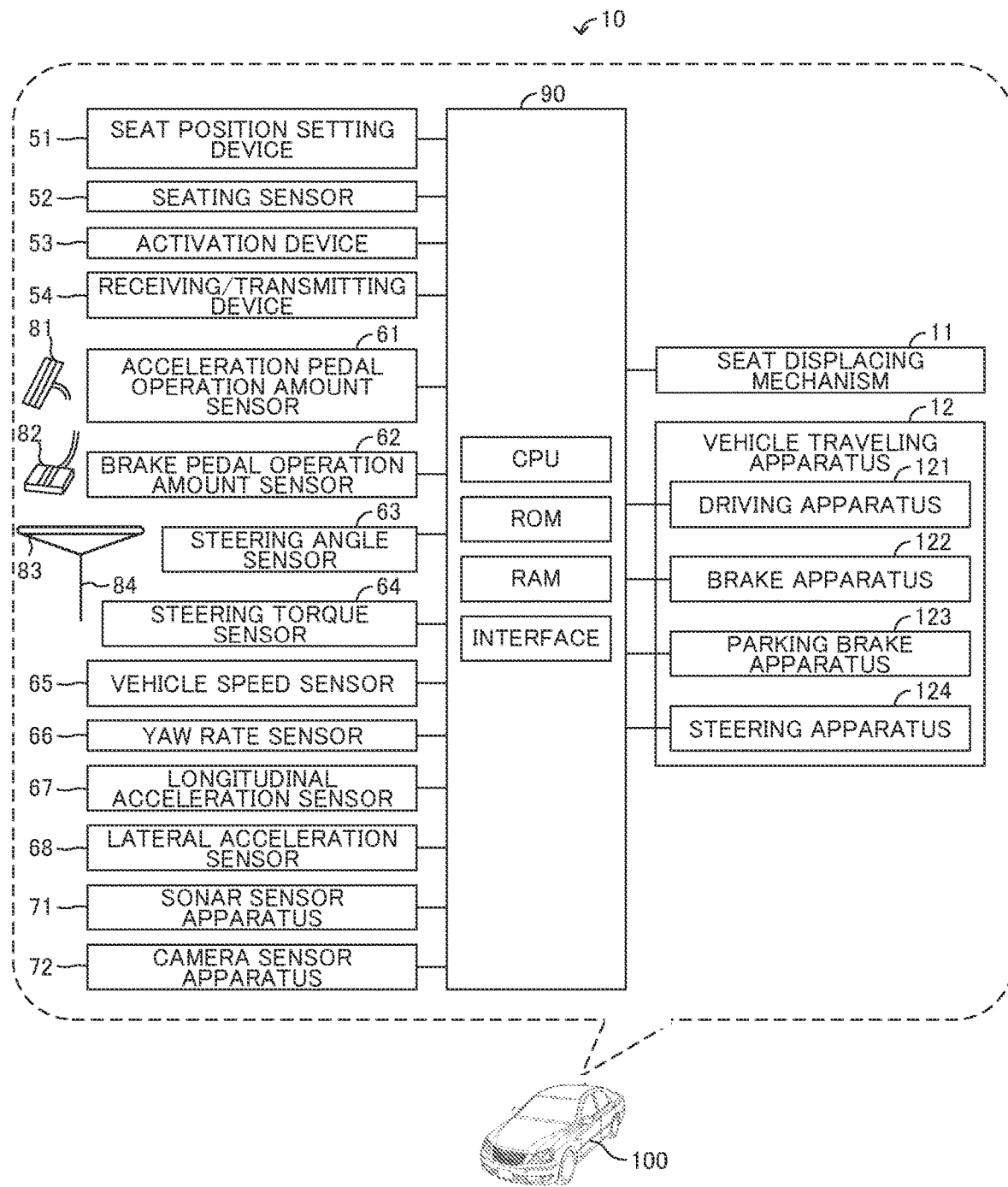
FIG. 1 is a view showing a vehicle control apparatus according to an embodiment of the invention and a vehicle installed with the vehicle control apparatus.

Below, a vehicle control apparatus according to an embodiment of the invention will be described with reference to the drawings. As shown in FIG. 1, the vehicle control apparatus 10 according to the embodiment of the invention is installed in a vehicle 100.

Figure 2A:
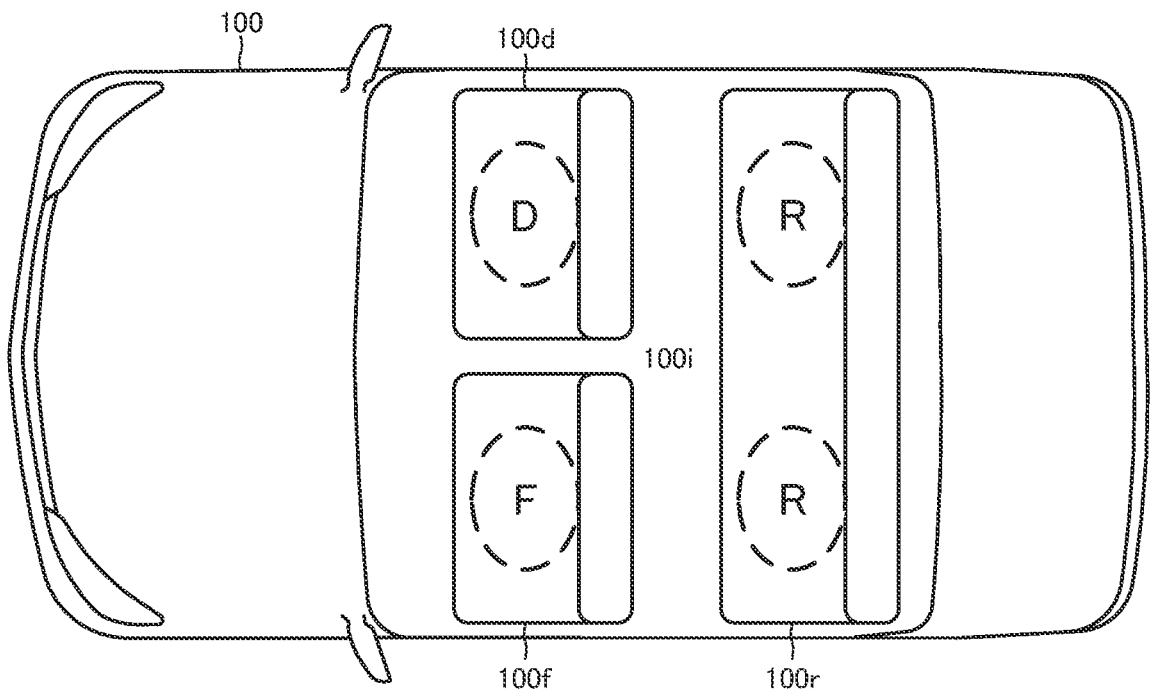
FIG. 2A is a view showing seats provided in the vehicle shown in FIG. 1.

As shown in FIG. 2A, a driver's seat 100$d$, a front-occupant's seat 100$f$, and a rear-occupant's seat 100$r$.

Figure 2B:
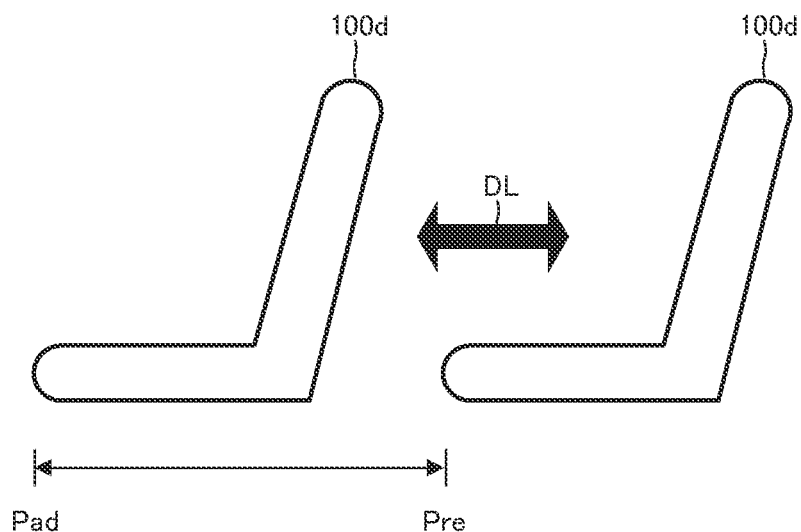
FIG. 2B is a view showing a driver's seat of the vehicle shown in FIG. 1.

The driver's seat 100$d$ is provided at a front area of a vehicle interior 100$i$ of the vehicle 100. The driver's seat 100$d$ is a seat which a driver D of the vehicle 100 sits on. As shown in FIG. 2B, the driver's seat 100$d$ can be displaced in a longitudinal direction DL of the vehicle 100. Thus, a position of the driver's seat 100$d$ can be adjusted in the longitudinal direction DL of the vehicle 100.

The front-occupant's seat 100$f$ is provided at the front area of the vehicle interior 100$i$ of the vehicle 100 next to the driver's seat 100$d$. The front-occupant's seat 100$f$ is a seat which a front occupant F other than the driver D sits on. The rear-occupant's seat 100$r$ is provided at a rear area of the vehicle interior 100$i$ of the vehicle 100. The rear-occupant's seat 100$r$ is a seat which rear occupants R other than the driver D sit on.

As shown in FIG. 1, the vehicle control apparatus 10 includes an ECU 90. ECU stands for electronic control unit. The ECU 90 includes a micro-computer as a main component. The micro-computer includes a CPU, a ROM, a RAM, a non-volatile memory, and an interface. The CPU realizes various functions by executing instructions, or programs, or routines stored in the ROM.

<Seat Displacing Mechanism>

A seat displacing mechanism 11 (or a seat sliding mechanism or a seat position adjusting mechanism) is provided on the vehicle 100. The seat displacing mechanism 11 is a mechanism which automatically displaces the driver's seat 100$d$ in the longitudinal direction DL of the vehicle 100.

The seat displacing mechanism 11 is electrically connected to the ECU 90. The ECU 90 can displace the driver's seat 100$d$ in the longitudinal direction DL of the vehicle 100 by controlling activations of the seat displacing mechanism 11. Hereinafter, a position of the driver's seat 100$d$ displaced rearward to and stopped by the seat displacing mechanism 11 as shown in FIG. 2B, will be referred to "backed position Pre". In addition, a position of the driver's seat 100$d$ displaced forward to and stopped by the seat displacing mechanism 11 as shown in FIG. 2B, will be referred to "advanced position Pad", <Seat Position Setting Apparatus>

A seat position setting device 51 is provided on the vehicle 100. The seat position setting device 51 is set in the vehicle interior 100$i$ such that the driver D can operate the seat position setting device 51.

The seat position setting device 51 may be a device such as a dial or switch which the driver D can physically operate. Alternatively, the seat position setting device 51 may be a device such as an icon displayed on a display which the driver D can operate with touch interactions.

The driver D can arbitrarily set the backed position Pre and the advanced position Pad by operating the seat position setting device 51. Thus, the driver D can set the backed position Pre to a position which the driver D can easily get out of the vehicle 100 and set the advanced position Pad to a position which the driver D can easily drive the vehicle 100.

The seat position setting device 51 is electrically connected to the ECU 90. When the seat position setting device 51 is operated to set the backed position Pre or the advanced position Pad, the seat position setting device 51 sends information on the backed position Pre or the advanced position Pad set by the driver D to the ECU 90. The ECU 90 memorizes the backed position Pre or the advanced position Pad set by the driver D as a designated backed position Pre_set or a designated advanced position Pad_set, respectively, based on the information sent from the seat position setting device 51.

The driver D can set a position of the driver's seat 100d which the driver D has manually adjusted by operating the seat position setting device 51 as the advanced position Pad or the backed position Pre.

When the seat position setting device 51 is operated to set the position of the driver's seat 100d manually adjusted by the driver D as the advanced position Pad or the backed position Pre, the seat position setting device 51 sends information on (i) the adjusted position of the driver's seat 100d and (ii) which of the advanced position Pad and the backed position Pre, the adjusted position of the driver's seat 100d should be set to. The ECU 90 memorizes the position manually adjusted by the driver D as the designated advanced position Pad_set or the designated backed position Pre_set, based on the information sent from the seat position setting device 51.

<Seating Sensor>

A seating sensor 52 is provided on the vehicle 100. The seating sensor 52 is electrically connected to the ECU 90. The seating sensor 52 sends a signal to the ECU 90 when the driver D sits on the driver's seat 100d. The ECU 90 determines that the driver D sits on the driver's seat 100d when the ECU 90 receives the signal from the seating sensor 52.

When an in-vehicle camera which takes images of the vehicle interior 100i, is provided on the vehicle 100, the ECU 90 may be configured to determine whether the driver D sits on the driver's seat 100d, based on the images taken by the in-vehicle camera.

<Vehicle Traveling Apparatus>

A driving apparatus 121, a brake apparatus 122, a parking brake apparatus 123, and a steering apparatus 124 are provided on the vehicle 100 as a vehicle traveling apparatus 12 used to travel the vehicle 100.

<Driving Apparatus>

The driving apparatus 121 is an apparatus which generates driving force (or driving torque) for driving the vehicle 100 and applying the generated driving force to the vehicle 100 (in particular, driven wheels of the vehicle 100). The driving apparatus 121 is, for example, an internal combustion engine and/or an electric motor. The driving apparatus 121 is electrically connected to the ECU 90. The ECU 90 can control the driving force applied to the vehicle 100 by controlling activations of the driving apparatus 121.

<Brake Apparatus>

The brake apparatus 122 is an apparatus which applies braking force (or braking torque) to the vehicle 100 (in particular, wheels of the vehicle 100) to brake the vehicle 100. The brake apparatus 122 is electrically connected to the ECU 90. The ECU 90 can control the braking force applied to the vehicle 100 by controlling activations of the brake apparatus 122.

<Parking Brake Apparatus>

The parking brake apparatus 123 is an apparatus which applies the braking force to the vehicle 100 (in particular, the wheels of the vehicle 100) to hold the vehicle 100 in a stopped state. The parking brake apparatus 123 is electrically connected to the ECU 90. The ECU 90 can add the braking force to the vehicle 100 to hold the vehicle 100 in the stopped state by activating the parking brake apparatus 123.

<Steering Apparatus>

The steering apparatus 124 is an apparatus which applies steering force (or steering torque) to the vehicle 100 (in particular, steered wheels of the vehicle 100) to steer the vehicle 100. The steering apparatus 124 is electrically connected to the ECU 90. The ECU 90 can control the steering force applied to the vehicle 100 by controlling activations of the steering apparatus 124.

<Activation Device>

An activation device 53 is provided on the vehicle 100. The activation device 53 is set at a position in the vehicle interior 100i such that the driver D can operate the activation device 53. The activation device 53 is, for example, a key-operated switch or a button-operated switch. The driver D can change an activation state of the vehicle control apparatus 10 (in particular, the ECU 90) from a deactivated state to an activated state or from the activated state to the deactivated state.

In this embodiment, the activated state corresponds to a state that the vehicle control apparatus 10 is energized ready to control activations of apparatuses such as the vehicle traveling apparatus 12. On the other hand, the deactivated state corresponds to a state that the vehicle control apparatus 10 is deenergized not to control the activations of the apparatuses such as the vehicle traveling apparatus 12.

The activation device 53 is electrically connected to the ECU 90. When the activation device 53 is operated to change the activation state of the ECU 90 from the deactivated state to the activated state, the activation device 53 sends an activation command to the ECU 90. The ECU 90 changes its activation state from the deactivated state to the activated state in response to receiving the activation command from the activation device 53. On the other hand, when the activation device 53 is operated to change the activation state of the ECU 90 from the activated state to the deactivated state, the activation device 53 sends a deactivation command to the ECU 90. The ECU 90 changes its activation state from the activated state to the deactivated state in response to receiving the deactivation command from the activation device 53.

<Receiving/Transmitting Device>

Figure 3:
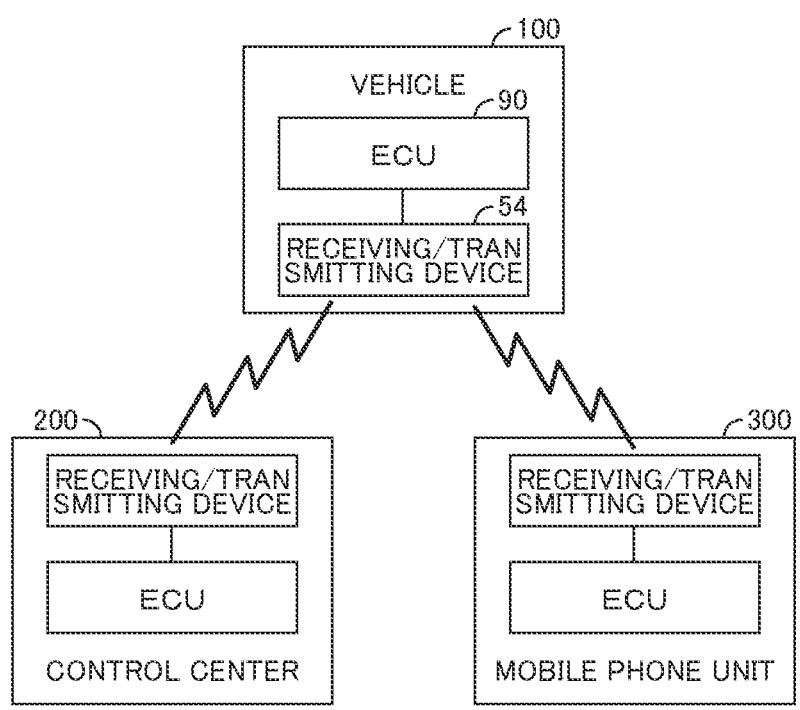
FIG. 3 is a view showing the vehicle control apparatus according to the embodiment of the invention, a control center which communicates the vehicle control apparatus by wireless, and a mobile phone unit which communicates the vehicle control apparatus by wireless.

A receiving/transmitting device 54 is provided on the vehicle 100. The receiving/transmitting device 54 is electrically connected to the ECU 90. The receiving/transmitting device 54 receives various wireless signals from the outside of the vehicle 100 and sends the received wireless signals to the ECU 90. In this embodiment, as shown in FIG. 3, the wireless signals are signals which are transmitted from a control center 200 of a parking facility and a mobile phone unit 300 by wireless.

The control center 200 of the parking facility is a facility provided with the parking facility which many vehicles can be parked. The wireless signals transmitted from the control center 200 are signals transmitted by an ECU of the control center 200 to the outside of the control center 200 via a receiving/transmitting device of the control center 200 by wireless. In this embodiment, the wireless signals transmitted from the control center 200 are signals of commanding the ECU 90 to execute an automatic parking control describe later.

The mobile phone unit 300 is a portable unit with a telephone function and a telecommunication function. The wireless signals transmitted from the mobile phone unit 300 are signals transmitted by an ECU of the mobile phone unit 300 to the outside of the mobile phone unit 300 via a receiving/transmitting device of the mobile phone unit 300 by wireless. In this embodiment, the wireless signals transmitted from the mobile phone unit 300 are signals of commanding the ECU 90 to execute the automatic parking control describe later.

The ECU 90 can transmit the signals to the outside of the vehicle control apparatus 10 via the receiving/transmitting device 54 by wireless. The wireless signals transmitted from the ECU 90 via the receiving/transmitting device 54 are, for example, signals such as ID signals used by the ECU of the control center 200 and the ECU of the mobile phone unit 300 to identify the ECU 90 which is installed in the vehicle 100, <Sensors>

Various sensors are provided on the vehicle 100. In this embodiment, the sensors include an acceleration pedal operation amount sensor 61, a brake pedal operation amount sensor 62, a steering angle sensor 63, a steering torque sensor 64, a vehicle speed sensor 65, a yaw rate sensor 66, a longitudinal acceleration sensor 67, a lateral acceleration sensor 68, a sonar sensor apparatus 71, and a camera sensor apparatus 72.

The acceleration pedal operation amount sensor 61 is electrically connected to the ECU 90. The ECU 90 detects an operation amount of an acceleration pedal 81 by the acceleration pedal operation amount sensor 61 and acquires the detected operation amount as an acceleration pedal operation amount AP. The ECU 90 controls the activations of the driving apparatus 121 to apply the driving force to the vehicle 100 from the driving apparatus 121, depending on the acquired acceleration pedal operation amount AP.

The brake pedal operation amount sensor 62 is electrically connected to the ECU 90. The ECU 90 detects an operation amount of a brake pedal 82 by the brake pedal operation amount sensor 62 and acquires the detected operation amount as a brake pedal operation amount BP. The ECU 90 controls the activations of the brake apparatus 122 to apply the braking force to the vehicle 100 from the brake apparatus 122, depending on the acquired brake pedal operation amount BP.

The steering angle sensor 63 and the steering torque sensor 64 are electrically connected to the ECU 90. The ECU 90 detects a rotation angle of a steering wheel 83 with respect to a neutral position by the steering angle sensor 63 and acquires the detected rotation angle as a steering angle θst. In addition, the ECU 90 detects a torque input to a steering shaft 84 by the driver D by the steering torque sensor 64 and acquires the detected torque as a steering torque TQst. The ECU 90 controls the activations of the steering apparatus 124 to apply the steering force to the vehicle 100 from the steering apparatus 124, depending on the acquired steering angle θst and the acquired steering torque TQst.

The vehicle speed sensor 65 is electrically connected to the ECU 90. The ECU 90 detects rotation speeds Vrot of wheels of the vehicle 100 by the vehicle speed sensor 65 and acquires the rotation speeds Vrot of the wheels. The ECU 90 acquires a moving speed of the vehicle 100 as a vehicle speed SPD, based on the acquired rotation speeds Vrot of the wheels.

The yaw rate sensor 66 is electrically connected to the ECU 90. The ECU 90 detects a yaw rate of the vehicle 100 by the yaw rate sensor 66 and acquires the detected yaw rate as a vehicle yaw rate YR.

The longitudinal acceleration sensor 67 is electrically connected to the ECU 90. The ECU 90 detects a longitudinal acceleration of the vehicle 100 by the longitudinal acceleration sensor 67 and acquires the detected longitudinal acceleration as a vehicle longitudinal acceleration Gx.

The lateral acceleration sensor 68 is electrically connected to the ECU 90. The ECU 90 detects a lateral acceleration of the vehicle 100 by the lateral acceleration sensor 68 and acquires the detected lateral acceleration as a vehicle lateral acceleration Gy.

The sonar sensor apparatus 71 includes clearance sonars. The sonar sensor apparatus 71 is electrically connected to the ECU 90. The sonar sensor apparatus 71 sends information detected by the clearance sonars to the ECU 90. The ECU 90 acquires information on objects around the vehicle 100, based on the information sent from the sonar sensor apparatus 71.

The camera sensor apparatus 72 includes cameras. The camera sensor apparatus 72 is electrically connected to the ECU 90. The camera sensor apparatus 72 sends information on images taken by the cameras to the ECU 90. The ECU 90 acquires information on the images taken by the cameras, based on the information sent from the camera sensor apparatus 72.

<Summary of Operations of Vehicle Control Apparatus>

Next, a summary of operations of the vehicle control apparatus 10 will be described.

When an activation state of the vehicle control apparatus 10 (in particular, the ECU 90) is changed from the activated state to the deactivated state, the vehicle control apparatus 10 executes an activation control of activating the seat displacing mechanism 11 to automatically displacing the driver's seat 100d rearward to the designated backed position Pre_set.

On the other hand, when the activation state of the vehicle control apparatus 10 (in particular, the ECU 90) is changed from the deactivated state to the activated state, the vehicle control apparatus 10 executes the activation control of activating the seat displacing mechanism 11 to automatically displacing the driver's seat 100d forward to the designated advanced position Pad_set.

In this connection, when the vehicle control apparatus 10 changes its activation state from the deactivated state to the activated state for executing an automatic pulling-out control described later, the vehicle control apparatus 10 does not displace the driver's seat 100d forward, but hold the driver's seat 100d at the designated backed position Pre_set. In other words, when a forbidding condition is satisfied, the vehicle control apparatus 10 does not displace the driver's seat 100d forward, but hold the driver's seat 100d at the designated backed position Pre_set. In this case, the forbidding condition is a condition that the vehicle control apparatus 10 changes its activation state from the deactivated state to the activated state for executing the automatic pulling-out control. When the forbidding condition is satisfied, the vehicle control apparatus 10 displaces the driver's seat 100d forward to the designated advanced position Pad_set when the seating sensor 52 detects the driver D sitting on the driver's seat 100d.

<Automatic Parking Control>

The automatic parking control includes a full-automatic parking control and a semi-automatic parking control.

Figure 4:
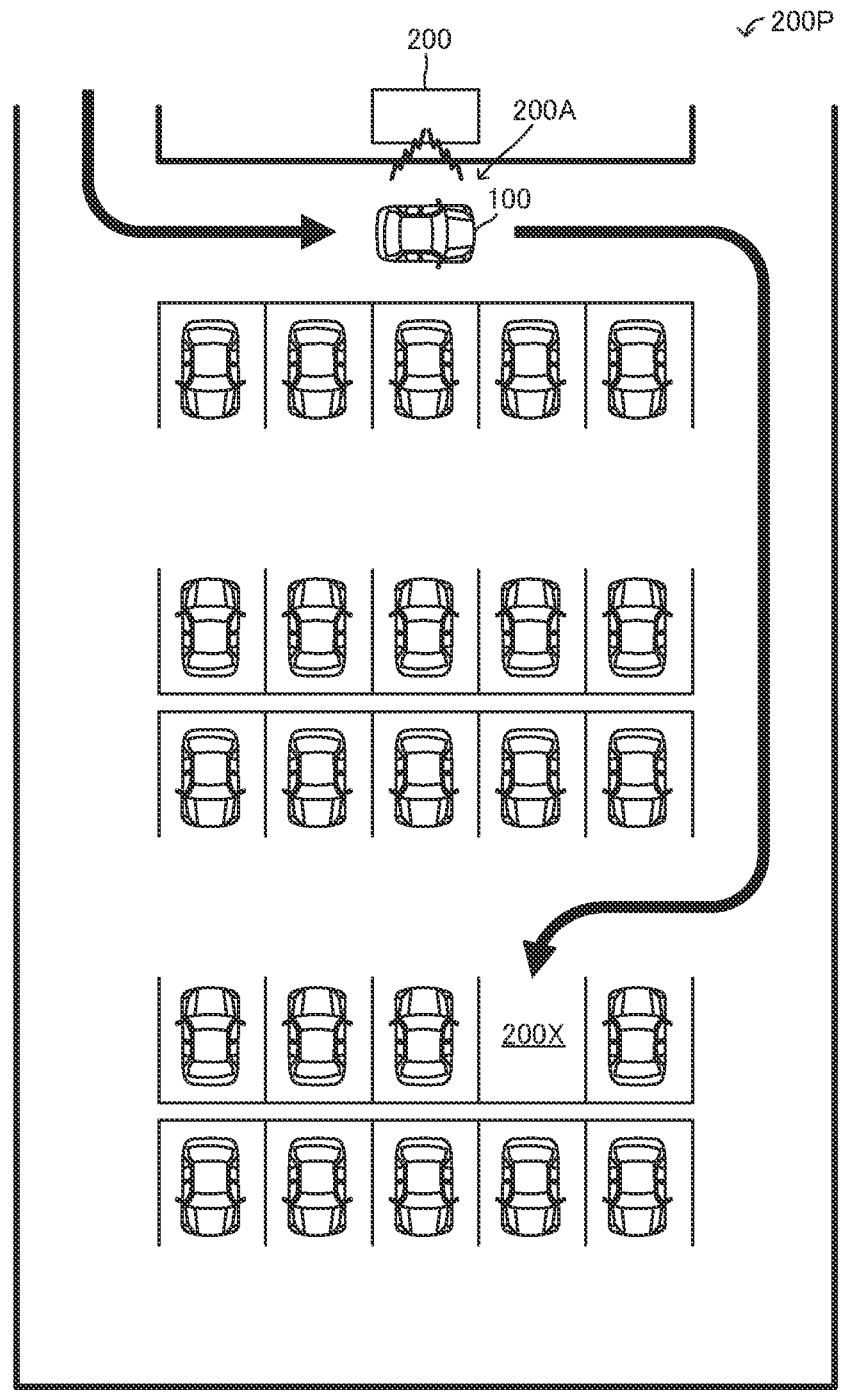
FIG. 4 is a view showing the vehicle moved by a full-automatic pulling-in control.
Figure 5:
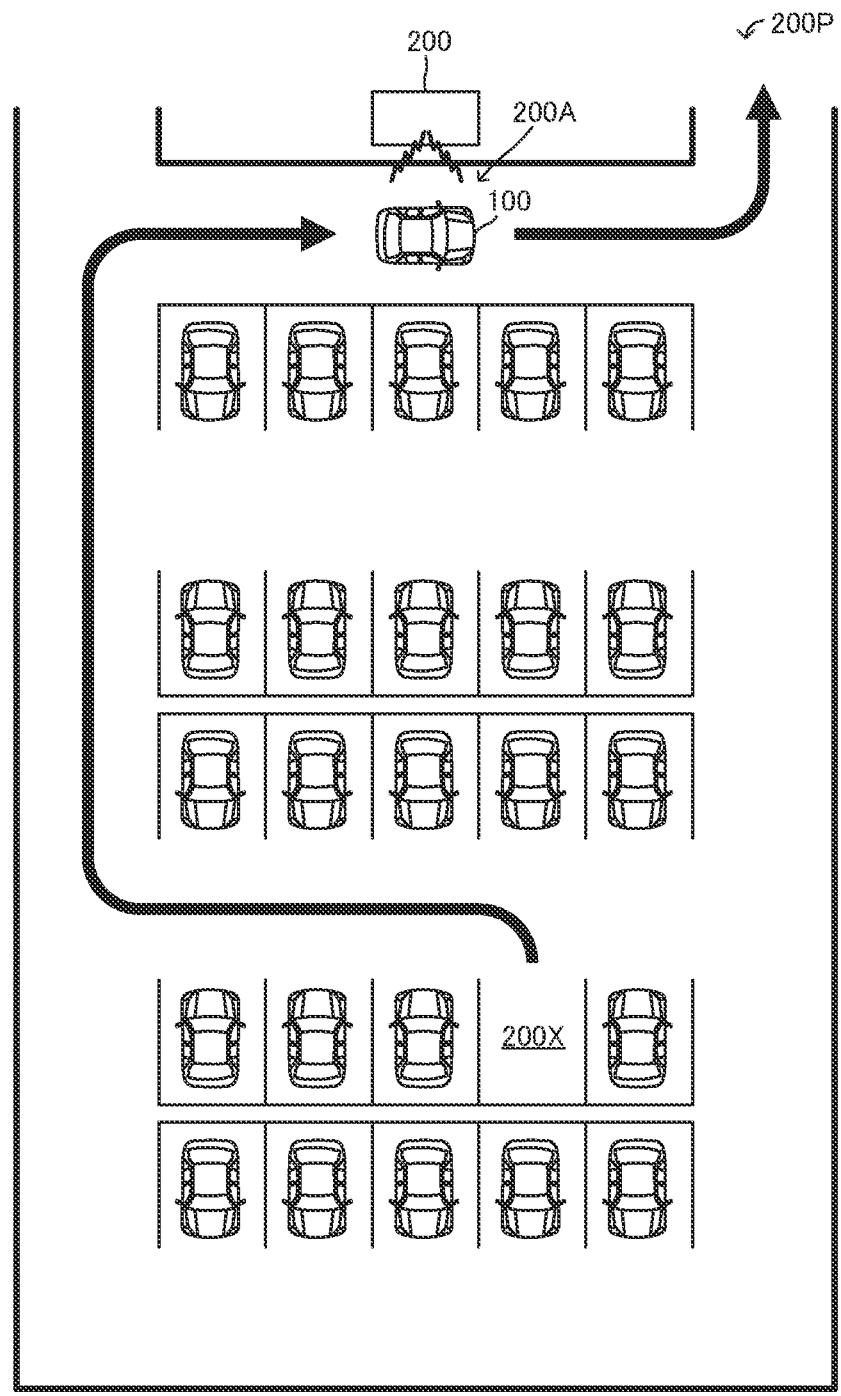
FIG. 5 is a view showing the vehicle moved by a full-automatic pulling-out control.

The full-automatic parking control is, for example, a so-called valet parking control. The valet parking control is a control of automatically pulling the vehicle 100 which had been stopped at a platform 200A of the parking facility into a designated parking space 200X and automatically stopping the vehicle 100 in the designated parking space 200X as shown in FIG. 4, and automatically pulling the vehicle 100 out of the parking space 200X to the platform 200A and automatically stopping the vehicle 100 at the platform 200A as shown in FIG. 5.

In addition, the full-automatic parking control includes a control of automatically pulling the vehicle 100 which had been stopped near a parking space of an ordinary house into the parking space and automatically stopping the vehicle 100 in the parking space, and automatically pulling the vehicle 100 out of the parking space to a designated place outside of the parking space and automatically stopping the vehicle 100 at the designated place.

Figure 6A:
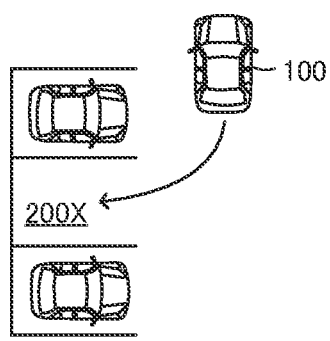
FIG. 6A is a view showing the vehicle moved by a semi-automatic pulling-in control.
Figure 6B:
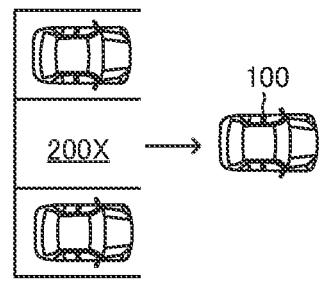
FIG. 6B is a view showing the vehicle moved by a semi-automatic pulling-out control.

The semi-automatic parking control is, for example, a so-called remote parking control. The remote parking control is a control of automatically pulling the vehicle 100 which had been stopped near the parking space 200X into the parking space 200X and automatically stopping the vehicle 100 in the parking space 200X as shown in FIG. 6A, and automatically pulling the vehicle 100 out of the parking space 200X and automatically stopping the vehicle 100 at the designated place outside of the parking space 200X as shown in FIG. GB. In the remote parking control, the vehicle 100 is automatically moved as long as operations to permit the vehicle 100 to move such as the touch interactions to a display of the mobile phone unit, are performed.

<Full-Automatic Parking Control>

The full-automatic parking control includes a full-automatic pulling-in control and a full-automatic pulling-out control. The full-automatic pulling-in control is one of automatic pulling-in controls of the automatic parking control, and the full-automatic pulling-out control is one of automatic pulling-out controls of the automatic parking control.

The full-automatic pulling-in control is a control of automatically pulling the vehicle 100 into the parking space and automatically stopping the vehicle 100 in the parking space even if the driver D does not operate traveling devices such as the acceleration pedal 81, the brake pedal 82, and the steering wheel 83.

The full-automatic pulling-out control is a control of automatically pulling the vehicle 100 out of the parking space and automatically stopping the vehicle 100 at the designated place even if the driver D does not operate the traveling devices.

When the vehicle control apparatus 10 receives an automatic pulling-in request command of requesting executing the full-automatic pulling-in control from an outside device of the mobile phone unit 300 or the control center 200 by wireless, the vehicle control apparatus 10 determines that changing its activation state from the deactivated state to the activated state is requested. Then, the vehicle control apparatus 10 changes its activation state from the deactivated state to the activated state. Then, the vehicle control apparatus 10 starts executing the full-automatic pulling-in control to move the vehicle 100 and stop the vehicle 100 in the designated parking space. When pulling the vehicle 100 into the designated parking space by the full-automatic pulling-in control is completed, the vehicle control apparatus 10 changes its activation state from the activated state to the deactivated state and terminates executing the full-automatic pulling-in control.

When the vehicle control apparatus 10 receives an automatic pulling-out request command of requesting executing the full-automatic pulling-out control from the outside device by wireless, the vehicle control apparatus 10 determines that changing its activation state from the deactivated state to the activated state is requested. Then, the vehicle control apparatus 10 changes its activation state from the deactivated state to the activated state. Then, the vehicle control apparatus 10 starts executing the full-automatic pulling-out control to pull the vehicle 100 out of the parking space and stop the vehicle 100 at the designated place. When pulling the vehicle 100 out of the parking space to the designated place by the full-automatic pulling-out control is completed, the vehicle control apparatus 10 terminates executing the full-automatic pulling-out control with holding its activation state in the activated state, <Semi-Automatic Parking Control>

The semi-automatic parking control includes a semi-automatic pulling-in control and a semi-automatic pulling-out control. The semi-automatic pulling-in control is one of the automatic pulling-in controls of the automatic parking control, and the semi-automatic pulling-out control is one of the automatic pulling-out controls of the automatic parking control.

The semi-automatic pulling-in control is a control of automatically pulling the vehicle 100 into the designated parking space and automatically stopping the vehicle 100 in the parking space even if the driver D does not operate the traveling devices. In this connection, when the vehicle control apparatus 10 executes the semi-automatic pulling-in control, the vehicle control apparatus 10 automatically moves the vehicle 100 as long as the operations to permit the vehicle 100 to move such as the touch interactions to the display of the mobile phone unit, are performed.

The semi-automatic pulling-out control is a control of automatically pulling the vehicle 100 out of the parking space and automatically stopping the vehicle 100 at the designated place even if the driver D does not operate the traveling devices. In this connection, when the vehicle control apparatus 10 executes the semi-automatic pulling-out control, the vehicle control apparatus 10 automatically moves the vehicle 100 as long as the operations to outside device to permit the vehicle 100 to move such as the touch interactions to the display of the mobile phone unit, are performed.

When the vehicle control apparatus 10 receives the automatic pulling-in request command of requesting executing the semi-automatic pulling-in control from the outside device by wireless, the vehicle control apparatus 10 determines that changing its activation state from the deactivated state to the activated state is requested. Then, the vehicle control apparatus 10 changes its activation state from the deactivated state to the activated state. Then, the vehicle control apparatus 10 starts executing the semi-automatic pulling-in control to pull the vehicle 100 into the designated parking space and stop the vehicle 100 in the designated parking space as long as the operations to the outside device to permit the vehicle 100 to move, are performed. When pulling the vehicle 100 into the designated parking space by the semi-automatic pulling-in control is completed, the vehicle control apparatus 10 changes its activation state from the activated state to the deactivated state and terminates executing the semi-automatic pulling-in control.

When the vehicle control apparatus 10 receives the automatic pulling-out request command of requesting executing the semi-automatic pulling-out control from the outside device by wireless, the vehicle control apparatus 10 determines that changing its activation state from the deactivated state to the activated state is requested. Then, the vehicle control apparatus 10 changes its activation state from the deactivated state to the activated state. Then, the vehicle control apparatus 10 starts executing the semi-automatic pulling-out control to pull the vehicle 100 out of the parking space and stop the vehicle 100 at the designated place as long as the operations to the outside device to permit the vehicle 100 to move, are performed. When pulling the vehicle 100 out of the parking space to the designated place by the semi-automatic pulling-out control is completed, the vehicle control apparatus 10 terminates executing the semi-automatic pulling-out control with holding its activation state in the activated state.

<Seat Displacing Control>

When the vehicle control apparatus 10 receives the deactivation command from the activation device 53, the vehicle control apparatus 10 changes its activation state from the activated state to the deactivated state. Also, when pulling the vehicle 100 into the designated parking space by the automatic parking control is completed, the vehicle control apparatus 10 changes its activation state from the activated state to the deactivated state. When the vehicle control apparatus 10 changes its activation state from the activated state to the deactivated state, the vehicle control apparatus 10 displaces the driver's seat 100d rearward to the designated backed position Pre_set.

When the vehicle control apparatus 10 receives the activation command from the activation device 53, the vehicle control apparatus 10 changes its activation state from the deactivated state to the activated state. Also, when the vehicle control apparatus 10 receives the activation command from the activation device 53, the vehicle control apparatus 10 changes its activation state from the deactivated state to the activated state.

When the vehicle control apparatus 10 changes its activation state from the deactivated state to the activated state in response to the activation command from the activation device 53, the vehicle control apparatus 10 displaces the driver's seat 100d forward to the designated advanced position Pad_set.

On the other hand, when the vehicle control apparatus 10 changes its activation state from the deactivated state to the activated state in response to an automatic pulling-out command from the outside device, the vehicle control apparatus 10 holds the driver's seat 100d at the designated backed position Pre_set without displacing the driver's seat 100d forward. In other words, when the forbidding condition is satisfied, the vehicle control apparatus 10 holds the driver's seat 100d at the designated backed position Pre_set without displacing the driver's seat 100d forward. In this case, the forbidding condition is a condition that executing the automatic pulling-out control is requested by the outside device. Then, the vehicle control apparatus 10 displaces the driver's seat 100d forward to the designated advanced position Pad_set when the driver D sitting on the driver's seat 100d is detected by the seating sensor 52.

Thereby, when the driver D gets in the vehicle 100 stopped at the designated place by the automatic pulling-out control, the driver's seat 100d is held at the backed position Pre, Thus, the driver D can easily get in the vehicle 100.

<Detailed Operations of Vehicle Control Apparatus>

Next, detailed operations of the vehicle control apparatus 10 will be described. The CPU of the ECU 90 of the vehicle control apparatus 10 is configured or programmed to execute a routine shown in FIG. 7 each time a predetermined time elapses.

Figure 7:
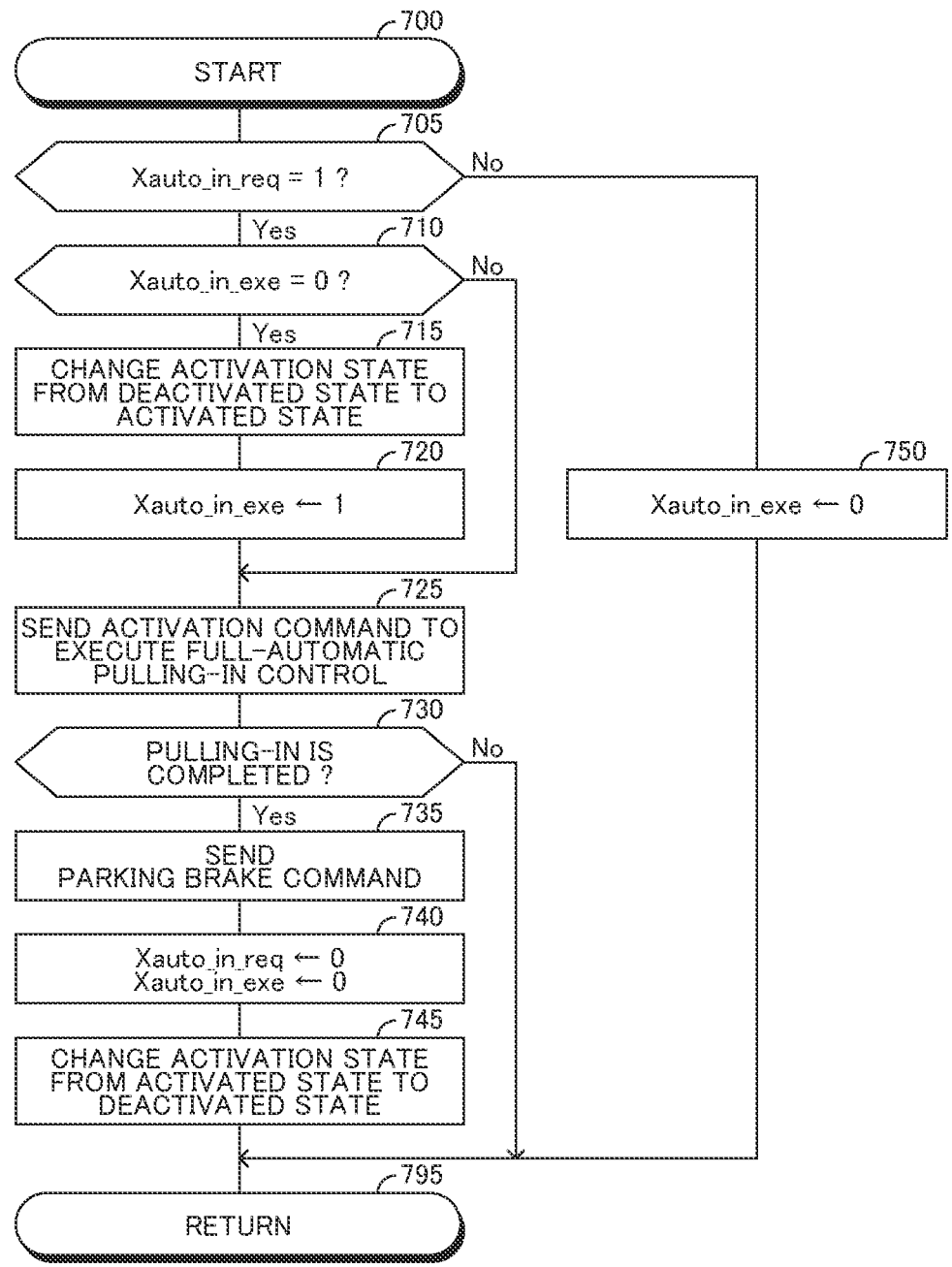
FIG. 7 is a view showing a flowchart of a routine executed by the vehicle control apparatus according to the embodiment of the invention.

Thus, at a predetermined timing, the CPU starts executing a process from a step 700 in FIG. 7 and proceeds with the process to a step 705 to determine whether a value of a full-automatic pulling-in request flag Xauto_in_req is "1". The full-automatic pulling-in request flag Xauto_in_req is a flag representing whether executing the full-automatic pulling-in control is requested. The value of the full-automatic pulling-in request flag Xauto_in_req is set to "1" when the automatic pulling-in request command of requesting executing the full-automatic pulling-in control, is received. On the other hand, the value of the full-automatic pulling-in request flag Xauto_in_req is set to "0" when executing the full-automatic pulling-in control is terminated, or stopping executing the full-automatic pulling-in control is requested.

When the CPU determines "Yes" at the step 705, the CPU proceeds with the process to a step 710 to determine whether a value of a full-automatic pulling-in executing flag Xauto_in_exe is "0". The full-automatic pulling-in executing flag Xauto_in_exe is a flag representing whether the full-automatic pulling-in control is being executed. The value of the full-automatic pulling-in executing flag Xauto_in_exe is set to "1" when executing the full-automatic pulling-in control is started. On the other hand, the value of the full-automatic pulling-in executing flag Xauto_in_exe is set to "0" when executing the full-automatic pulling-in control is terminated, or stopped.

When the CPU determines "Yes" at the step 710, the CPU proceeds with the process to a step 715 to change its activation state from the deactivated state to the activated state. Next, the CPU proceeds with the process to a step 720 to set the value of the full-automatic pulling-in executing flag Xauto_in_exe to "1". Next, the CPU proceeds with the process to a step 725.

On the other hand, when the CPU determines "No" at the step 710, the CPU proceeds with the process directly to the step 725.

When the CPU proceeds with the process to the step 725, the CPU sends an activation command of pulling the vehicle 100 into the designated parking space to the vehicle traveling apparatus 12. Thereby, the vehicle 100 is automatically moved. Next, the CPU proceeds with the process to a step 730 to determine whether pulling the vehicle 100 into the designated parking space, is completed.

When the CPU determines "Yes" at the step 730, the CPU proceeds with the process to a step 735 to send a parking brake command to the parking brake apparatus 123. Thereby, the vehicle 100 is held in the stopped state by the parking brake apparatus 123. Next, the CPU proceeds with the process to a step 740 to set the value of the full-automatic pulling-in request flag Xauto_in_req to "0" and the value of the full-automatic pulling-in executing flag Xauto_in_exe to "0". Next, the CPU proceeds with the process to a step 745 to change its activation state from the activated state to the deactivated state. Then, the CPU proceeds with the process to a step 795 to terminate executing this routine once.

On the other hand, when the CPU determines "No" at the step 730, the CPU proceeds with the process directly to the step 795 to terminate executing this routine once. In this case, executing the full-automatic pulling-in control is continued.

When the CPU determines "No" at the step 705, the CPU proceeds with the process to a step 750 to set the value of the full-automatic pulling-in executing flag Xauto_in_exe to "0". Then, the CPU proceeds with the process to the step 795 to terminate executing this routine once.

Figure 8:
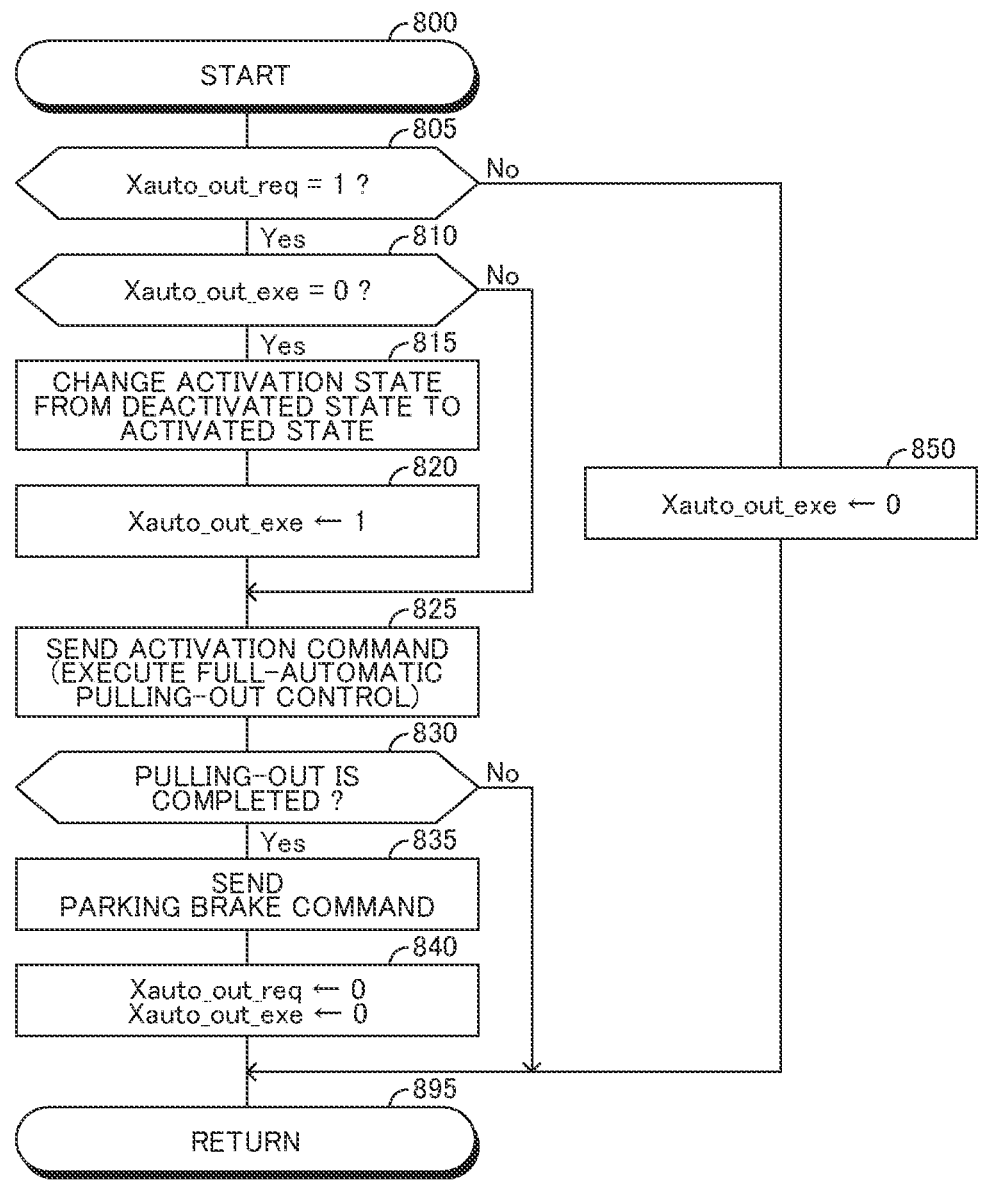
FIG. 8 is a view showing a flowchart of a routine executed by the vehicle control apparatus according to the embodiment of the invention.

In addition, the CPU of the ECU 90 of the vehicle control apparatus 10 is configured or programmed to execute a routine shown in FIG. 8 each time the predetermined time elapses.

Thus, at a predetermined timing, the CPU starts executing a process from a step 800 in FIG. 8 and proceeds with the process to a step 805 to determine whether a value of a full-automatic pulling-out request flag Xauto_out_req is "1". The full-automatic pulling-out request flag Xauto_out_req is a flag representing whether executing the full-automatic pulling-out control is requested. The value of the full-automatic pulling-out request flag Xauto_out_req is set to "1" when the automatic pulling-out request command of requesting executing the full-automatic pulling-out control, is received. On the other hand, the value of the full-automatic pulling-out request flag Xauto_out_req is set to "0" when executing the full-automatic pulling-out control is terminated, or stopping executing the full-automatic pulling-out control is requested.

When the CPU determines "Yes" at the step 805, the CPU proceeds with the process to a step 810 to determine whether a value of a full-automatic pulling-out executing flag Xauto_out_exe is "0". The full-automatic pulling-out executing flag Xauto_out_exe is a flag representing whether the full-automatic pulling-out control is being executed. The value of the full-automatic pulling-out executing flag Xauto_out_exe is set to "1" when executing the full-automatic pulling-out control is started. On the other hand, the value of the full-automatic pulling-out executing flag Xauto_out_exe is set to "0" when executing the full-automatic pulling-out control is terminated, or stopped.

When the CPU determines "Yes" at the step 810, the CPU proceeds with the process to a step 815 to change its activation state from the deactivated state to the activated state. Next, the CPU proceeds with the process to a step 820 to set the value of the full-automatic pulling-out executing flag Xauto_out_exe to "1". Next, the CPU proceeds with the process to a step 825.

On the other hand, when the CPU determines "No" at the step 810, the CPU proceeds with the process directly to the step 825.

When the CPU proceeds with the process to the step 825, the CPU sends an activation command of pulling the vehicle 100 out of the parking space to the designated place to the vehicle traveling apparatus 12. Thereby, the vehicle 100 is automatically moved. Next, the CPU proceeds with the process to a step 830 to determine whether pulling the vehicle 100 out of the parking space to the designated place, is completed.

When the CPU determines "Yes" at the step 830, the CPU proceeds with the process to a step 835 to send the parking brake command to the parking brake apparatus 123. Thereby, the vehicle 100 is held in the stopped state by the parking brake apparatus 123. Next, the CPU proceeds with the process to a step 840 to set the value of the full-automatic pulling-out request flag Xauto_out_req to "0" and the value of the full-automatic pulling-out executing flag Xauto_out_exe to "0". Then, the CPU proceeds with the process to a step 895 to terminate executing this routine once. In this case, the CPU holds its activation state in the activated state.

On the other hand, when the CPU determines "No" at the step 830, the CPU proceeds with the process directly to the step 895 to terminate executing this routine once. In this case, executing the full-automatic pulling-out control is continued.

When the CPU determines "No" at the step 805, the CPU proceeds with the process to a step 850 to set the value of the full-automatic pulling-out executing flag Xauto_out_exe to "0". Then, the CPU proceeds with the process to the step 895 to terminate executing this routine once.

Figure 9:
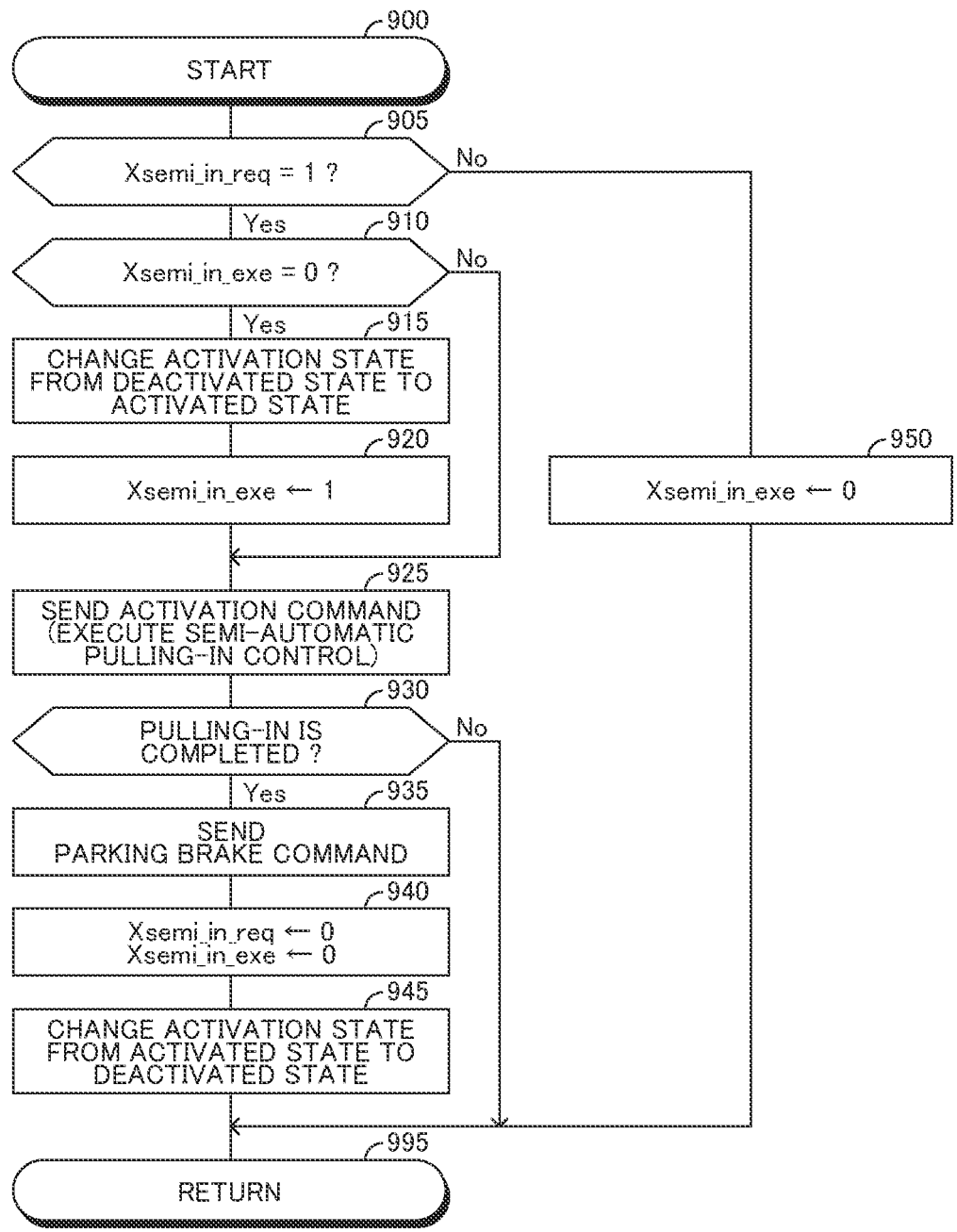
FIG. 9 is a view showing a flowchart of a routine executed by the vehicle control apparatus according to the embodiment of the invention.

In addition, the CPU of the ECU 90 of the vehicle control apparatus 10 is configured or programmed to execute a routine shown in FIG. 9 each time the predetermined time elapses.

Thus, at a predetermined timing, the CPU starts executing a process from a step 900 in FIG. 9 and proceeds with the process to a step 905 to determine whether a value of a semi-automatic pulling-in request flag Xsemi_in_req is "1". The semi-automatic pulling-in request flag Xsemi_in_req is a flag representing whether executing the semi-automatic pulling-in control is requested. The value of the semi-automatic pulling-in request flag Xsemi_in_req is set to "1" when the automatic pulling-in request command of requesting executing the semi-automatic pulling-in control, is received. On the other hand, the value of the semi-automatic pulling-in request flag Xsemi_in_req is set to "0" when executing the semi-automatic pulling-in control is terminated, or stopping executing the semi-automatic pulling-in control is requested.

When the CPU determines "Yes" at the step 905, the CPU proceeds with the process to a step 910 to determine whether a value of a semi-automatic pulling-in executing flag Xsemi_in_exe is "0". The semi-automatic pulling-in executing flag Xsemi_in_exe is a flag representing whether the semi-automatic pulling-in control is being executed. The value of the semi-automatic pulling-in executing flag Xsemi_in_exe is set to "1" when executing the semi-automatic pulling-in control is started. On the other hand, the value of the semi-automatic pulling-in executing flag Xsemi_in_exe is set to "0" when executing the semi-automatic pulling-in control is terminated, or stopped.

When the CPU determines "Yes" at the step 910, the CPU proceeds with the process to a step 915 to change its activation state from the deactivated state to the activated state. Next, the CPU proceeds with the process to a step 920 to set the value of the semi-automatic pulling-in executing flag Xsemi_in_exe to "1". Next, the CPU proceeds with the process to a step 925.

On the other hand, when the CPU determines "No" at the step 910, the CPU proceeds with the process directly to the step 925.

When the CPU proceeds with the process to the step 925, the CPU sends the activation command of pulling the vehicle 100 into the designated parking space to the vehicle traveling apparatus 12. Thereby, the vehicle 100 is automatically moved as long as automatic moving of the vehicle 100 is permitted. Next, the CPU proceeds with the process to a step 930 to determine whether pulling the vehicle 100 into the designated parking space, is completed.

When the CPU determines "Yes" at the step 930, the CPU proceeds with the process to a step 935 to send the parking brake command to the parking brake apparatus 123. Thereby, the vehicle 100 is held in the stopped state by the parking brake apparatus 123. Next, the CPU proceeds with the process to a step 940 to set the value of the semi-automatic pulling-in request flag Xsemi_in_req to "0" and the value of the semi-automatic pulling-in executing flag Xsemi_in_exe to "0". Next, the CPU proceeds with the process to a step 945 to change its activation state from the activated state to the deactivated state. Then, the CPU proceeds with the process to a step 995 to terminate executing this routine once.

On the other hand, when the CPU determines "No" at the step 930, the CPU proceeds with the process directly to the step 995 to terminate executing this routine once. In this case, executing the semi-automatic pulling-in control is continued.

When the CPU determines "No" at the step 905, the CPU proceeds with the process to a step 950 to set the value of the semi-automatic pulling-in executing flag Xsemi_in_exe to "0". Then, the CPU proceeds with the process to the step 995 to terminate executing this routine once.

Figure 10:
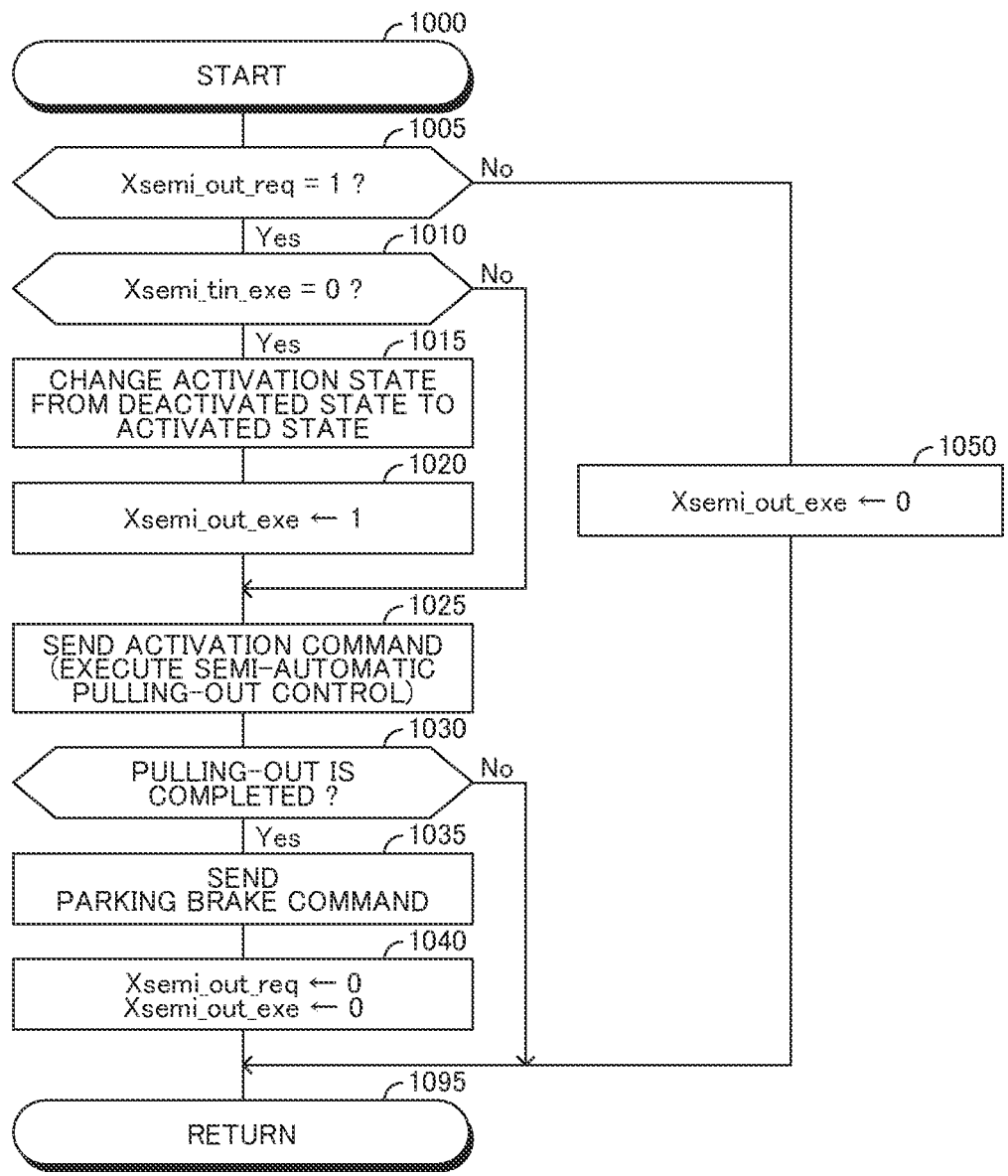
FIG. 10 is a view showing a flowchart of a routine executed by the vehicle control apparatus according to the embodiment of the invention.

In addition, the CPU of the ECU 90 of the vehicle control apparatus 10 is configured or programmed to execute a routine shown in FIG. 10 each time the predetermined time elapses.

Thus, at a predetermined timing, the CPU starts executing a process from a step 1000 in FIG. 10 and proceeds with the process to a step 1005 to determine whether a value of a semi-automatic pulling-out request flag Xsemi_out_req is "1". The semi-automatic pulling-out request flag Xsemi_out_req is a flag representing whether executing the semi-automatic pulling-out control is requested. The value of the semi-automatic pulling-out request flag Xsemi_out_req is set to "1" when the automatic pulling-out request command of requesting executing the semi-automatic pulling-out control, is received. On the other hand, the value of the semi-automatic pulling-out request flag Xsemi_out_req is set to "0" when executing the semi-automatic pulling-out control is terminated, or stopping executing the semi-automatic pulling-out control is requested.

When the CPU determines "Yes" at the step 1005, the CPU proceeds with the process to a step 1010 to determine whether a value of a semi-automatic pulling-out executing flag Xsemi_out_exe is "0". The semi-automatic pulling-out executing flag Xsemi_out_exe is a flag representing whether the semi-automatic pulling-out control is being executed. The value of the semi-automatic pulling-out executing flag Xsemi_out_exe is set to "1" when executing the semi-automatic pulling-out control is started. On the other hand, the value of the semi-automatic pulling-out executing flag Xsemi_out_exe is set to "0" when executing the semi-automatic pulling-out control is terminated, or stopped.

When the CPU determines "Yes" at the step 1010, the CPU proceeds with the process to a step 1015 to change its activation state from the deactivated state to the activated state. Next, the CPU proceeds with the process to a step 1020 to set the value of the semi-automatic pulling-out executing flag Xsemi_out_exe to "1". Next, the CPU proceeds with the process to a step 1025.

On the other hand, when the CPU determines "No" at the step 1010, the CPU proceeds with the process directly to the step 1025.

When the CPU proceeds with the process to the step 1025, the CPU sends the activation command of pulling the vehicle 100 out of the parking space to the designated place to the vehicle traveling apparatus 12. Thereby, the vehicle 100 is automatically moved as long as the automatic moving of the vehicle 100 is permitted. Next, the CPU proceeds with the process to a step 1030 to determine whether pulling the vehicle 100 out of the parking space to the designated place, is completed.

When the CPU determines "Yes" at the step 1030, the CPU proceeds with the process to a step 1035 to send the parking brake command to the parking brake apparatus 123. Thereby, the vehicle 100 is held in the stopped state by the parking brake apparatus 123. Next, the CPU proceeds with the process to a step 1040 to set the value of the semi-automatic pulling-out request flag Xsemi_out_req to "0" and the value of the semi-automatic pulling-out executing flag Xsemi_out_exe to "0". Then, the CPU proceeds with the process to a step 1095 to terminate executing this routine once. In this case, the CPU holds its activation state in the activated state.

On the other hand, when the CPU determines "No" at the step 1030, the CPU proceeds with the process directly to the step 1095 to terminate executing this routine once. In this case, executing the semi-automatic pulling-out control is continued.

When the CPU determines "No" at the step 1005, the CPU proceeds with the process to a step 1050 to set the value of the semi-automatic pulling-out executing flag Xsemi_out_exe to "0". Then, the CPU proceeds with the process to the step 1095 to terminate executing this routine once.

Figure 11:
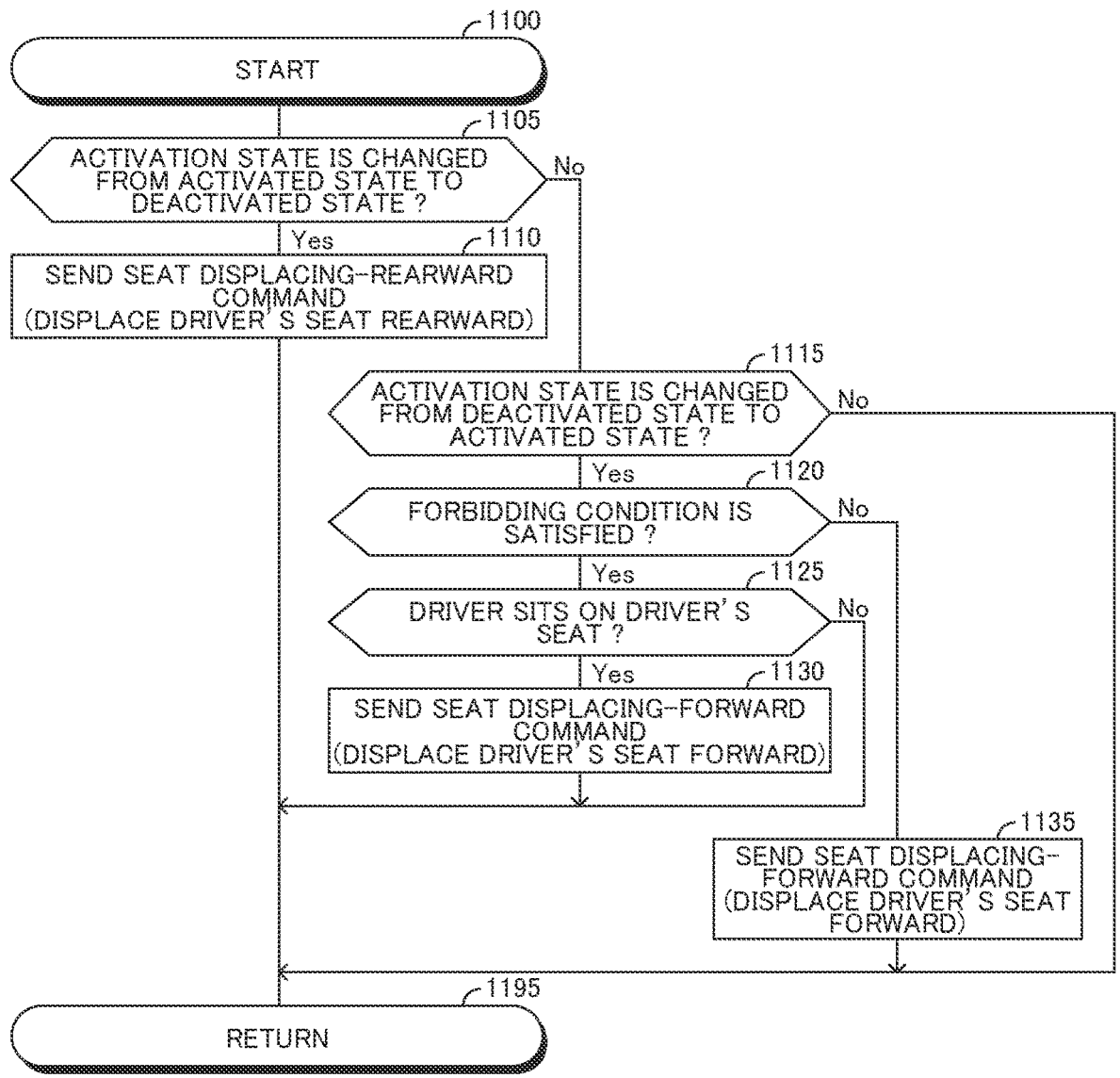
FIG. 11 is a view showing a flowchart of a routine executed by the vehicle control apparatus according to the embodiment of the invention.

In addition, the CPU of the ECU 90 of the vehicle control apparatus 10 is configured or programmed to execute a routine shown in FIG. 11 each time the predetermined time elapses.

Thus, at a predetermined timing, the CPU starts executing a process from a step 1100 in FIG. 11 and proceeds with the process to a step 1105 to determine whether its activation state is changed from the activated state to the deactivated state.

When the CPU determines "Yes" at the step 1105, the CPU proceeds with the process to a step 1110 to send a seat displacing-rearward command to the seat displacing mechanism 11. Thereby, the driver's seat 100d is displaced rearward to the designated backed position Pre_set by the seat displacing mechanism 11. Then, the CPU proceeds with the process to a step 1195 to terminate executing this routine once.

On the other hand, when the CPU determines "No" at the step 1105, the CPU proceeds with the process to a step 1115 to determine whether its activation state is changed from the deactivated state to the activated state.

When the CPU determines "Yes" at the step 1115, the CPU proceeds with the process to a step 1120 to determine whether the forbidding condition is satisfied. The forbidding condition is the condition that its activation state is changed from the deactivated state to the activated state in response to receiving the automatic pulling-cut request command.

When the CPU determines "Yes" at the step 1120, the CPU proceeds with the process to a step 1125 to determine whether the driver D sitting on the driver's seat 100d is detected by the seating sensor 52.

When the CPU determines "Yes" at the step 1125, the CPU proceeds with the process to a step 1130 to send a seat displacing-forward command to the seat displacing mechanism 11. Thereby, the driver's seat 100d is displaced forward to the designated advanced position Pad_set by the seat displacing mechanism 11. Then, the CPU proceeds with the process to the step 1195 to terminate executing this routine once.

On the other hand, when the CPU determines "No" at the step 1125, the CPU proceeds with the process directly to the step 1195 to terminate executing this routine once. In this case, the driver's seat 100d is held at the designated backed position Pre_set without being displaced forward.

When the CPU determines "No" at the step 1120, the CPU proceeds with the process to a step 1135 to send the seat displacing-forward command to the seat displacing mechanism 11. Thereby, the driver's seat 100d is displaced forward to the designated advanced position Pad_set by the seat displacing mechanism 11. Then, the CPU proceeds with the process to the step 1195 to terminate executing this routine once.

When the CPU determines "No" at the step 1115, the CPU proceeds with the process directly to the step 1195 to terminate executing this routine once.

The detailed operations of the vehicle control apparatus 10 have been described.

It should be noted that the invention is not limited to the aforementioned embodiments, and various modifications can be employed within the scope of the invention.

First Modified Example

For example, according to a first modified example of the embodiment of the invention, the vehicle control apparatus 10 may be configured to displace the driver's seat 100*d* forward to the designated advanced position Pad_set when a predetermined time Tth elapses since the driver D sitting on the driver's seat 100*d* is detected by the seating sensor 52.

In particular, the vehicle control apparatus 10 according to the first modified example holds the driver's seat 100*d* at the designated backed position Pre_set without displacing the driver's seat 100*d* when the vehicle control apparatus 10 changes its activation state from the deactivated state to the activated state in response to receiving the automatic pulling-out request command from the outside device. When the predetermined time Tth elapses since the driver D sitting on the driver's seat 100*d* is detected by the seating sensor 52, the vehicle control apparatus 10 displaces the driver's seat 100*d* forward to the designated advanced position Pad_set.

If the driver's seat 100*d* starts to be displaced forward before the driver D sits on the driver's seat 100*d* to be ready to drive the vehicle 100, the driver D may be surprised. According to the first modified example, the driver's seat 100*d* is displaced forward when a certain time elapses since the driver D sitting on the driver's seat 100*d* is detected. Thus, the driver's seat 100*d* starts to be displaced forward after the driver D sits on the driver's seat 100*d* to be ready to drive the vehicle 100. Thus, it can be prevented from surprising the driver D.

Figure 12:
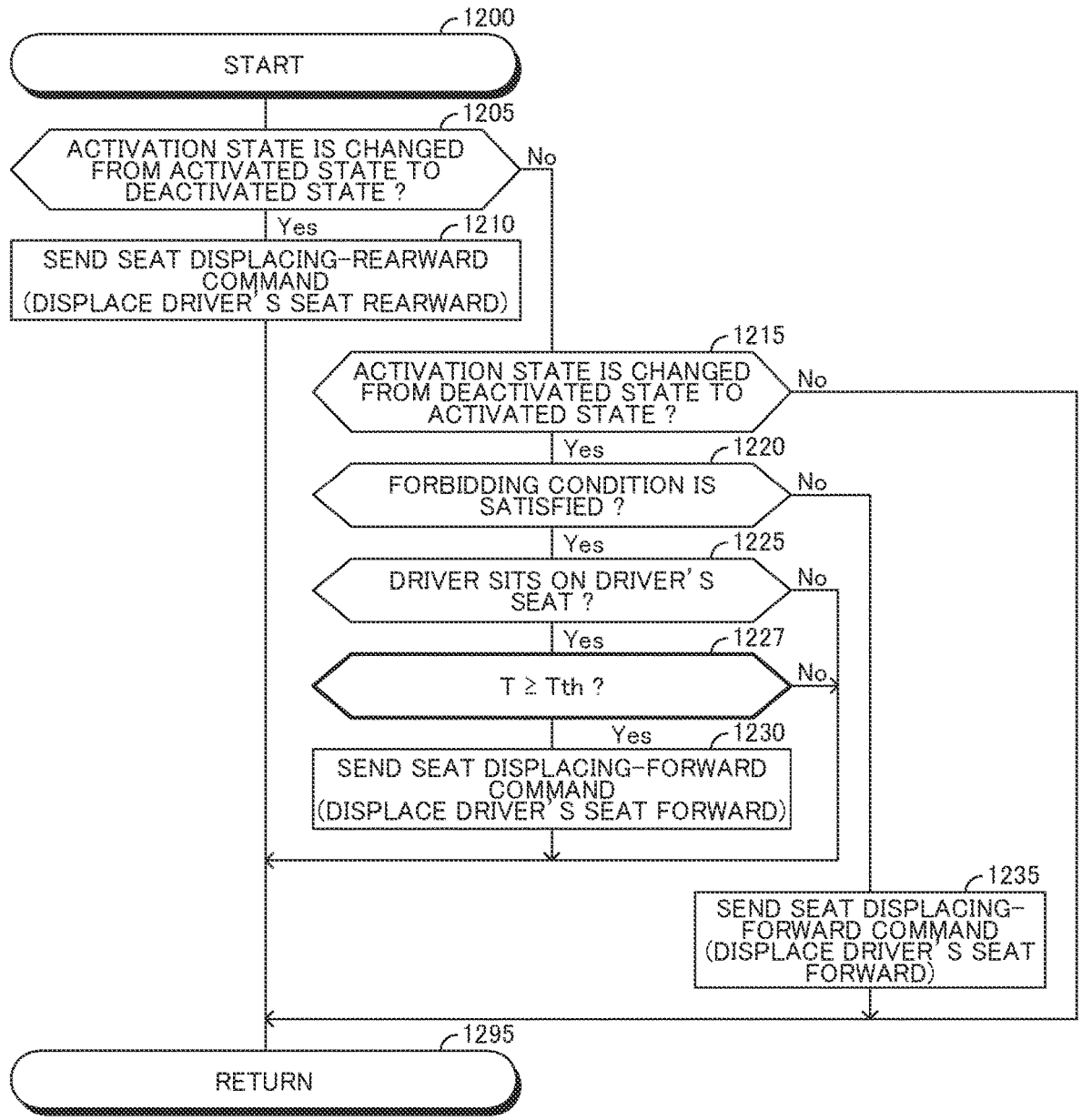
FIG. 12 is a view showing a flowchart of a routine executed by the vehicle control apparatus according to a first modified example of the embodiment of the invention.

The CPU of the ECU 90 of the vehicle control apparatus 10 according to the first modified example is configured or programmed to execute a routine shown in FIG. 12 in place of the routine shown in FIG. 11.

The routine shown in FIG. 12 is the same as the routine shown in FIG. 11 except that a step 1227 is added to the routine shown in FIG. 11. Thus, steps 1205 to 1225, 1230, and 1235 of the routine shown in FIG. 12 are the same as the steps 1105 to 1125, 1130, and 1135 of the routine shown in FIG. 11, respectively.

When the CPU determines "Yes" at the step 1225, the CPU proceeds with the process to the step 1227 to determine whether a time elapsing since the CPU first determines at the step 1225 that the driver D sitting on the driver's seat 100*d* is detected by the seating sensor 52, is longer than or equal to the predetermined time Tth.

When the CPU determines "Yes" at the step 1227, the CPU proceeds with the process to the step 1230 to send the seat displacing-forward command to the seat displacing mechanism 11. On the other hand, when the CPU determines "No" at the step 1227, the CPU proceeds with the process directly to a step 1295 to terminate executing this routine once.

Second Modified Example

Further, according to a second modified example of the embodiment of the invention, the vehicle control apparatus 10 may be configured to displace the driver's seat 100*d* rearward to the designated backed position Pre_set when the vehicle control apparatus 10 is in the activated state and receives the automatic pulling-out request command from the outside device by wireless.

In particular, the vehicle control apparatus 10 may be configured to displace the driver's seat 100*d* rearward to the designated backed position Pre_set when the vehicle control apparatus 10 receives the automatic pulling-out request command from the outside device after the vehicle control apparatus 10 changes its activation state from the deactivated state to the activated state in response to the activation command from the activation device 53.

Thereby, the driver's seat 100*d* is displaced forward to the designated advanced position Pad_set when the activation state of the vehicle control apparatus 10 is changed to the activated state in response to the activation command. In this connection, the driver's seat 100*d* is at the designated backed position Pre_set when the vehicle 100 is stopped at the designated place by the automatic pulling-out control. Thus, the driver D can easily get in the vehicle 100.

Figure 13:
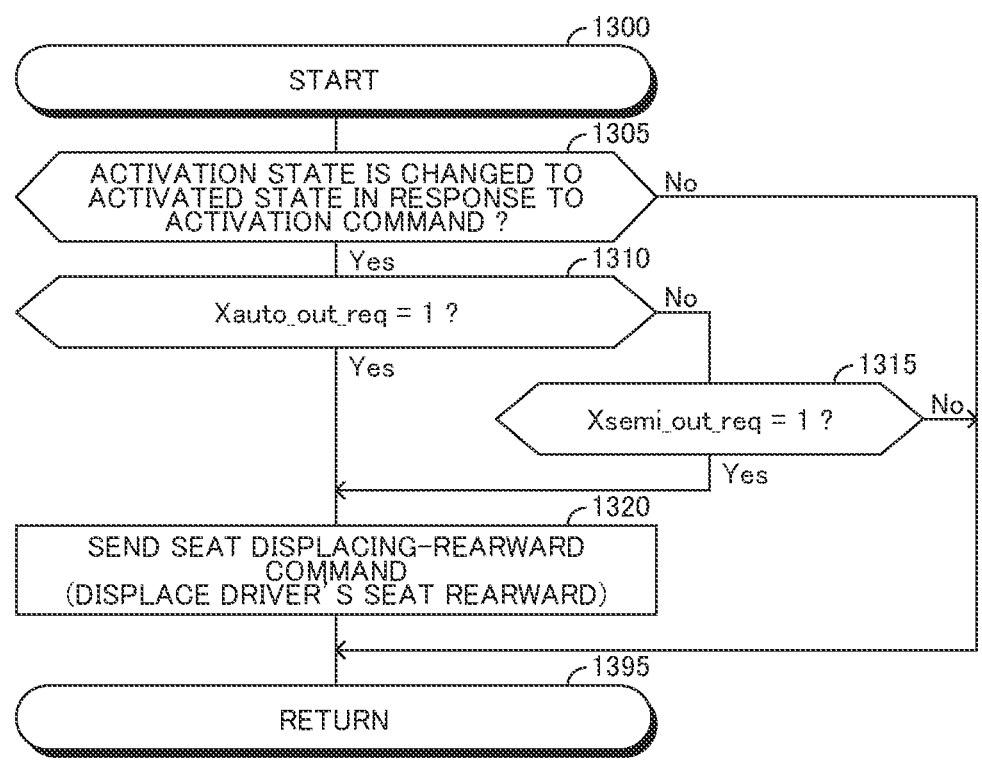
FIG. 13 is a view showing a flowchart of a routine executed by the vehicle control apparatus according to a second modified example of the embodiment of the invention.

The CPU of the ECU 90 of the vehicle control apparatus 10 according to the second modified example is configured or programmed to execute a routine shown in FIG. 13 each time the predetermined time elapses.

Thus, at a predetermined timing, the CPU starts executing a process from a step 1300 in FIG. 13 and proceeds with the process to a step 1305 to determine whether its activation state is changed to the activated state in response to the activation command from the activation device 53.

When the CPU determines "Yes" at the step 1305, the CPU proceeds with the process to a step 1310 to determine whether the value of the full-automatic pulling-out request flag Xauto_out_req is "1". That is, the CPU determines whether executing the full-automatic pulling-out control is requested from the outside device.

When the CPU determines "Yes" at the step 1310, the CPU proceeds with the process to a step 1320 to send the seat displacing-rearward command to the seat displacing mechanism 11. Thereby, the driver's seat 100*d* is displaced rearward to the designated backed position Pre_set by the seat displacing mechanism 11. Then, the CPU proceeds with the process to a step 1395 to terminate executing this routine once.

On the other hand, when the CPU determines "No" at the step 1310, the CPU proceeds with the process to a step 1315 to determine whether the value of the semi-automatic pulling-out request flag Xsemi_out_req is "1". That is, the CPU determines whether executing the semi-automatic pulling-out control is requested from the outside device.

When the CPU determines "Yes" at the step 1315, the CPU proceeds with the process to a step 1320 to send the seat displacing-rearward command to the seat displacing mechanism 11. Thereby, the driver's seat 100*d* is displaced to the designated backed position Pre_set by the seat displacing mechanism 11. Then, the CPU proceeds with the process to a step 1395 to terminate executing this routine once.

On the other hand, when the CPU determines "No" at the step 1315, the CPU proceeds with the process directly to the step 1395 to terminate executing this routine once.

Also, when the CPU determines "No" at the step 1305, the CPU proceeds with the process directly to the step 1395 to terminate executing this routine once.

Third Modified Example

Further, according to a third modified example of the embodiment of the invention, the vehicle control apparatus 10 may be configured to hold the driver's seat 100d at the designated backed position Pre_set without displacing the driver's seat 100d forward when the vehicle control apparatus 10 changes its activation state from the deactivated state to the activated state in response to receiving the automatic pulling-in request command from the outside device.

Thereby, the driver's seat 100d does not need to be displaced rearward to the designated backed position Preset when the activation state of the vehicle control apparatus 10 is changed from the activated state to the deactivated state, and executing the full-automatic pulling-in control or the semi-automatic pulling-in control is terminated.

The CPU of the ECU 90 of the vehicle control apparatus 10 according to the third modified example is configured or programmed to execute the routine shown in FIG. 11 each time the predetermined time elapses. In this case, the CPU determines at the step 1125 in FIG. 11 whether the forbidding condition that the CPU has changed its activation state from the deactivated state to the activated state in response to receiving the automatic puling-oat request command from the outside device, is satisfied, or whether the forbidding condition that the CPU has changed its activation state from the deactivated state to the activated state in response to receiving the automatic pulling-in request command from the outside device.

What is claimed is:

1. A vehicle control apparatus installed to a vehicle and comprising an electronic control unit which executes an activation control of controlling activations of a driving apparatus, a braking apparatus, and a steering apparatus of the vehicle,
wherein the electronic control unit is configured to:
change its activation state to an activated state that the electronic control unit executes the activation control when the electronic control unit receives an activation command;
change its activation state to a deactivated state that the electronic control unit does not execute the activation control when the electronic control unit receives a deactivation command;
displace a driver's seat for a driver of the vehicle forward to a designated advanced position when the electronic control unit changes its activation state to the activated state; and
displace the driver's seat rearward to a designated backed position located at the rear of the designated advanced position when the electronic control unit changes its activation state to the deactivation state,
wherein the electronic control unit is configured to:
change its activation state to the activated state and execute an automatic pulling-out control of automatically pulling the vehicle out of a parking space to a designated place and automatically stopping the vehicle at the designated place when the electronic control unit receives an automatic pulling-out request command of requesting the electronic control unit to execute the automatic pulling-out control from an outside by wireless; and
hold the driver's seat at the designated backed position without displacing the driver's seat forward when the electronic control unit changes its activation state to the activated state in response to receiving the automatic pulling-out request command.

2. The vehicle control apparatus as set forth in claim 1, wherein the electronic control unit is configured to displace the driver's seat to the designated advanced position when the driver of the vehicle sits on the driver's seat after the electronic control unit receives the automatic pulling-out request command and holds the driver's seat at the designated backed position without displacing the driver's seat forward.

3. The vehicle control apparatus as set forth in claim 1, wherein the electronic control unit is configured to displace the driver's seat to the designated advanced position when a predetermined time elapses since the driver of the vehicle sits on the driver's seat after the electronic control unit receives the automatic pulling-out request command and holds the driver's seat at the designated backed position without displacing the driver's seat forward.

4. The vehicle control apparatus as set forth in claim 1, wherein the electronic control unit is configured to hold its activation state in the activated state when the electronic control unit terminates executing the automatic pulling-out control.

5. The vehicle control apparatus as set forth in claim 1, wherein
the vehicle control apparatus comprises an activation device which is operated by the driver to send the activation command to the electronic control unit;
the electronic control unit is configured to:
change its activation state from the disactivated state to the activated state and displace the driver's seat forward to the designated advanced position when the electronic control unit receives the activation command sent in response to an operation of the driver to the activation device; and
displace the driver's seat rearward from the designated advanced position to the designated backed position when the electronic control unit is in the activated state and receives the automatic pulling-out request command.

6. The vehicle control apparatus as set forth in claim 1, wherein the electronic control unit is configured to execute an automatic pulling-in control of automatically pulling the vehicle into a designated parking space and automatically stopping the vehicle in the designated parking space when the electronic control unit is in the deactivated state and receives an automatic pulling-in request command of requesting the electronic control unit to execute the automatic pulling-in control.

* * * * *